(12) United States Patent
Yamazaki

(10) Patent No.: US 10,846,132 B2
(45) Date of Patent: Nov. 24, 2020

(54) INFORMATION PROCESSING APPARATUS

(71) Applicant: Toyota Jidosha Kabushiki Kaisha, Toyota (JP)

(72) Inventor: Mikio Yamazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 16/196,796

(22) Filed: Nov. 20, 2018

(65) Prior Publication Data

US 2019/0179669 A1  Jun. 13, 2019

(30) Foreign Application Priority Data

Dec. 7, 2017 (JP) ................... 2017-234863

(51) Int. Cl.
| | | |
|---|---|---|
| G06F 9/48 | (2006.01) | |
| G06F 13/16 | (2006.01) | |
| G06F 9/54 | (2006.01) | |
| G06F 9/52 | (2006.01) | |
| G06F 12/084 | (2016.01) | |

(52) U.S. Cl.
CPC .............. *G06F 9/4881* (2013.01); *G06F 9/52* (2013.01); *G06F 9/544* (2013.01); *G06F 12/084* (2013.01); *G06F 13/1663* (2013.01)

(58) Field of Classification Search
CPC ................................. G06F 9/4881; G06F 9/52
USPC ...................................................... 718/1–108
See application file for complete search history.

(56) References Cited

U.S. PATENT DOCUMENTS

| | | | |
|---|---|---|---|
| 6,304,957 B1* | 10/2001 | Ishihara ................ | G06F 9/3842 712/228 |
| 10,635,485 B2* | 4/2020 | Chagam Reddy ......................... | H04L 67/1097 |
| 2003/0093628 A1* | 5/2003 | Matter ................ | G06F 13/1663 711/153 |
| 2008/0077937 A1* | 3/2008 | Shin ..................... | G11C 7/1075 719/312 |

(Continued)

FOREIGN PATENT DOCUMENTS

| | | |
|---|---|---|
| JP | H09282297 A | 10/1997 |
| JP | 2008-034095 A | 2/2008 |
| JP | 2009-110063 A | 5/2009 |

OTHER PUBLICATIONS

Shafique, Muhammad, et al. "Minority-game-based resource allocation for run-time reconfigurable multi-core processors." 2011 Design, Automation & Test in Europe. IEEE, 2011.pp. 1-6 (Year: 2011).*

(Continued)

*Primary Examiner* — Satish Rampuria
(74) *Attorney, Agent, or Firm* — Dinsmore & Shohl LLP

(57) ABSTRACT

An information processing apparatus includes a multi-core processor including at least three processor cores, and a memory configured to be accessed by the at least three processor cores. The memory has at least four data areas adapted to store data. The at least three processor cores include a first processor core and a second processor core each configured to perform an update task of updating data stored in the at least four data areas. The first processor core is configured to perform the update task on a non-object data area that is selected from the at least four data areas and is not an object of processing performed by the second processor core.

3 Claims, 4 Drawing Sheets

(56) References Cited

U.S. PATENT DOCUMENTS

| | | | | |
|---|---|---|---|---|
| 2012/0265744 | A1* | 10/2012 | Berkowitz | G06Q 30/0613 |
| | | | | 707/705 |
| 2012/0330869 | A1* | 12/2012 | Durham | G06N 5/022 |
| | | | | 706/16 |
| 2015/0286663 | A1* | 10/2015 | Mangan, III | G06Q 10/063 |
| | | | | 707/722 |
| 2017/0286301 | A1* | 10/2017 | Chang | G06F 12/084 |

OTHER PUBLICATIONS

Sarkar, Abhik, et al. "Push-assisted migration of real-time tasks in multi-core processors." ACM Sigplan Notices 44.7 (2009): pp. 80-89. (Year: 2009).*

Gil-Costa, Veronica, et al. "Scheduling metric-space queries processing on multi-core processors." 2010 18th Euromicro Conference on Parallel, Distributed and Network-based Processing. IEEE, 2010.pp. 187-194 (Year: 2010).*

Indiveri, Giacomo, and Shih-Chii Liu. "Memory and information processing in neuromorphic systems." Proceedings of the IEEE 103.8 (2015): pp. 1379-1397. (Year: 2015).*

Christophe, Emmanuel, Julien Michel, and Jordi Inglada. "Remote sensing processing: From multicore to GPU." IEEE Journal of Selected Topics in Applied Earth Observations and Remote Sensing 4.3 (2011): pp. 643-652. (Year: 2011).*

Munir, Arslan, Ann Gordon-Ross, and Sanjay Ranka. "Multi-core embedded wireless sensor networks: Architecture and applications." IEEE Transactions on Parallel and Distributed Systems 25.6 (2013): pp. 1553-1562. (Year: 2013).*

\* cited by examiner

INFORMATION PROCESSING APPARATUS

CROSS-REFERENCE TO RELATED APPLICATIONS

This application claims priority to Japanese Patent Application No. 2017-234863 filed on Dec. 7, 2017, incorporated herein by reference in its entirety.

BACKGROUND

1. Technical Field

The disclosure relates to an information processing apparatus.

2. Description of Related Art

One type of the information processing apparatus including a multi-core central processing unit (CPU) and a memory (RAM) has been proposed (see, for example, Japanese Unexamined Patent Application Publication No. 2009-110063 (JP 2009-110063A)). The memory includes two or more data areas (blocks). In this information processing apparatus, the multi-core CPU performs an update task of updating data stored in one data area selected from the two or more data areas of the memory, and a reference task of referring to data stored in a block that is different from a block in which data is updated, in parallel with each other. Thus, the processing time is shortened, as compared, with the case where the multi-core CPU waits for completion of one of the two tasks (update task and reference task), and then executes the other task.

SUMMARY

In the above information processing apparatus, one update task and the reference task are performed in parallel. However, if two update tasks and another task (such as a reference task) are to be performed in parallel, one of the two update tasks and the other task may be performed in parallel, but a data area as an object of the other update task may conflict with a data area as an object of the other task; as a result, data may not be appropriately updated.

An information processing apparatus according to one aspect of the disclosure appropriately updates data stored in a data area of a memory, when two update tasks are performed in parallel.

One aspect of the disclosure is concerned with an information processing apparatus. The information processing apparatus includes a multi-core processor including at least three processor cores, and a memory configured to be accessed by the at least three processor cores. The memory has at least four data areas adapted to store data. The at least three processor cores include a first processor core and a second processor core each configured to perform an update task of updating data stored in the data areas. The first processor core is configured to perform the update task on a non-object data area that is selected from the at least four data areas and is not an object of processing performed by the second processor core.

With the above configuration, the data area as an object of processing of the second processor core different from the first processor core does not conflict with the data area as an object of the update task of the first processor core. Thus, the first processor core can appropriately update data stored in the data area of the memory.

In the above information processing apparatus, the memory may have an index area that stores a plurality of indexes each indicating an object data area for each task performed on each of the at least four data areas. The object data area may be selected from the at least four data areas, and provide an object of processing performed by the at least three processor cores. The first processor core may be configured to perform the update task on the non-object data area, after writing one of the at least four data areas which is not indicated by the indexes, into one index of the indexes, as the non-object data area. With the above configuration, the data stored in the data areas of the memory can be appropriately updated.

In the above information processing apparatus, the indexes may include a first index, a second index, a third index, and a fourth index. The first index may indicate a data area on which the update task is being performed. The second index may indicate a data area on which a reference task of referring to data stored in the data area is being performed. The third index may indicate a data area as an object of processing of an abnormality determination task of determining whether an abnormality occurs to the data area. The fourth index may indicate a data area on which the update task is completed most recently. The non-object data area may be a data area that is not indicated by any of the second index, the third index and the fourth index. With the above configuration, the non-object data area can be set more appropriately.

In the above information processing apparatus, the first processor core may be configured to update the fourth index such that the fourth index indicates the data area that provides an object of the update task, when the update task is completed.

In the above information processing apparatus, the second processor core may be configured to successively perform an abnormality detection task of detecting whether an abnormality occurs to the data areas, on the at least four data areas. With this configuration, it is possible to perform the abnormality detection task, while updating the data stored in the data area of the memory. In this case, the time required to perform the abnormality detection task may be longer than the time required to perform the update task.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating one example of an update processing routine executed by a processor core 34a;

DETAILED DESCRIPTION OF EMBODIMENTS

Next, one embodiment of the disclosure will be described.

Figure 1:
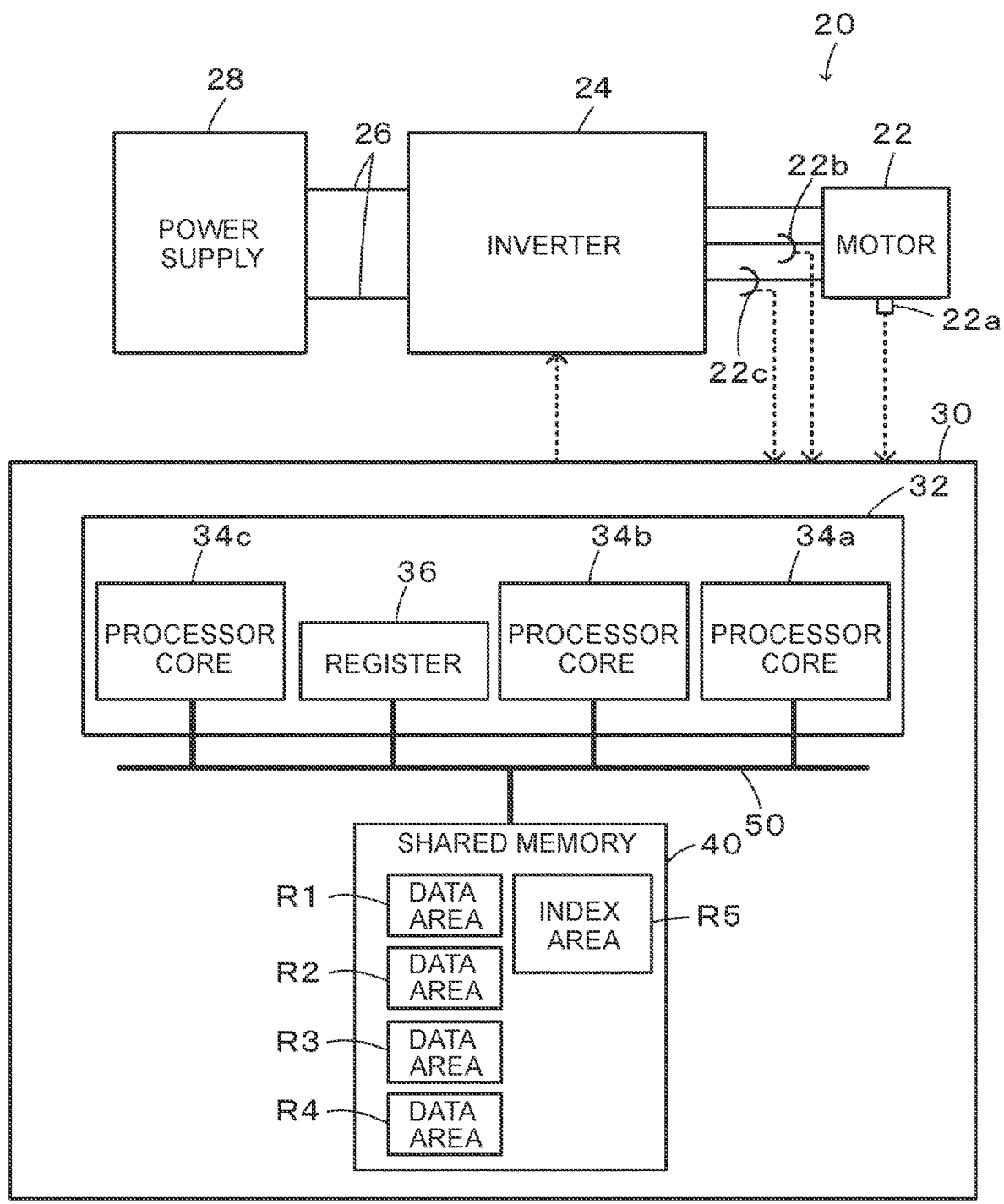
FIG. 1 is a view schematically showing the configuration of a motor system 20 equipped with an information processing apparatus as one embodiment of the disclosure.

FIG. 1 schematically shows the configuration of a motor system 20 equipped with an information processing apparatus according to one embodiment of the disclosure. The motor system 20 includes a motor 22, inverter 24, power supply 28, and multi-core microcomputer 30. For example, the motor system 20 is installed on an electric vehicle that travels with power from the motor 22, for example.

The motor 22 is in the form of a synchronous generator-motor, and includes a rotor in which permanent magnets are embedded, and a stator on which three-phase coils are wound.

The inverter 24 is connected to the motor 22, and is also connected to a power line 26. The inverter 24 includes a plurality of transistors (switching devices) (not shown) in the form of power semiconductor devices. When a voltage is applied to the power line 26, the transistors of the inverter 24 are switched on or off under control of the multi-core microcomputer 30, so that the motor 22 is rotated or driven.

The power supply 28 is in the form of a lithium-ion secondary battery or nickel-hydrogen secondary battery having a rated voltage of 200V or 250V, for example, and is connected to the power line 26.

The multi-core microcomputer 30 includes a multi-core processor 32, and a shared memory 40. The multi-core microcomputer 30 further includes a ROM that stores processing programs (not shown), various maps, etc., and input and output ports.

The multi-core processor 32 functions as a central processing unit (CPU), and includes processor cores 34a-34c and a register 36. The processor cores 34a-34c send and receive data to and from the register 36 and the shared memory 40, via a bus 50, and output various processing requests to the shared memory 40.

The shared memory 40 is configured as a random access memory having data areas R1-R4 and an index area R5. The data areas R1-R4 store data received from the multi-core processor 32. The index area R5 stores four indexes indicating data areas as processing objects for each task performed on the data areas. In this embodiment, "WriteNow", "Read", "Check", and "WriteComp" are listed as the four indexes. The "WriteNow" indicates a data area that is an object of an update task of updating data. The "Read" indicates a data area, as one of the data areas R1-R4, on which a reference task of referring to data from the multi-core processor 32 is performed. The "Check" indicates a data area, as one of the data areas R1-R4, on which an abnormality determination task is performed by the multi-core processor 32. The "WriteComp" indicates a data area, as one of the data areas R1-R4, on which the data update task was completed most recently (i.e., a data area as an object of updating in the latest update task). The "WriteNow", "Read", "Check", and "WriteComp" are set to value 1 to value 4. The value 1 to value 4 represent the data areas R1 to R4, respectively.

Next, operation of the motor system 20 thus configured, in particular, operation of the processor cores 34a to 34c of the multi-core processor 32 will be described. Initially, operation of the processor core 34a will be described. Then, operation of the processor cores 34b, 34c will be successively described.

Figure 2:
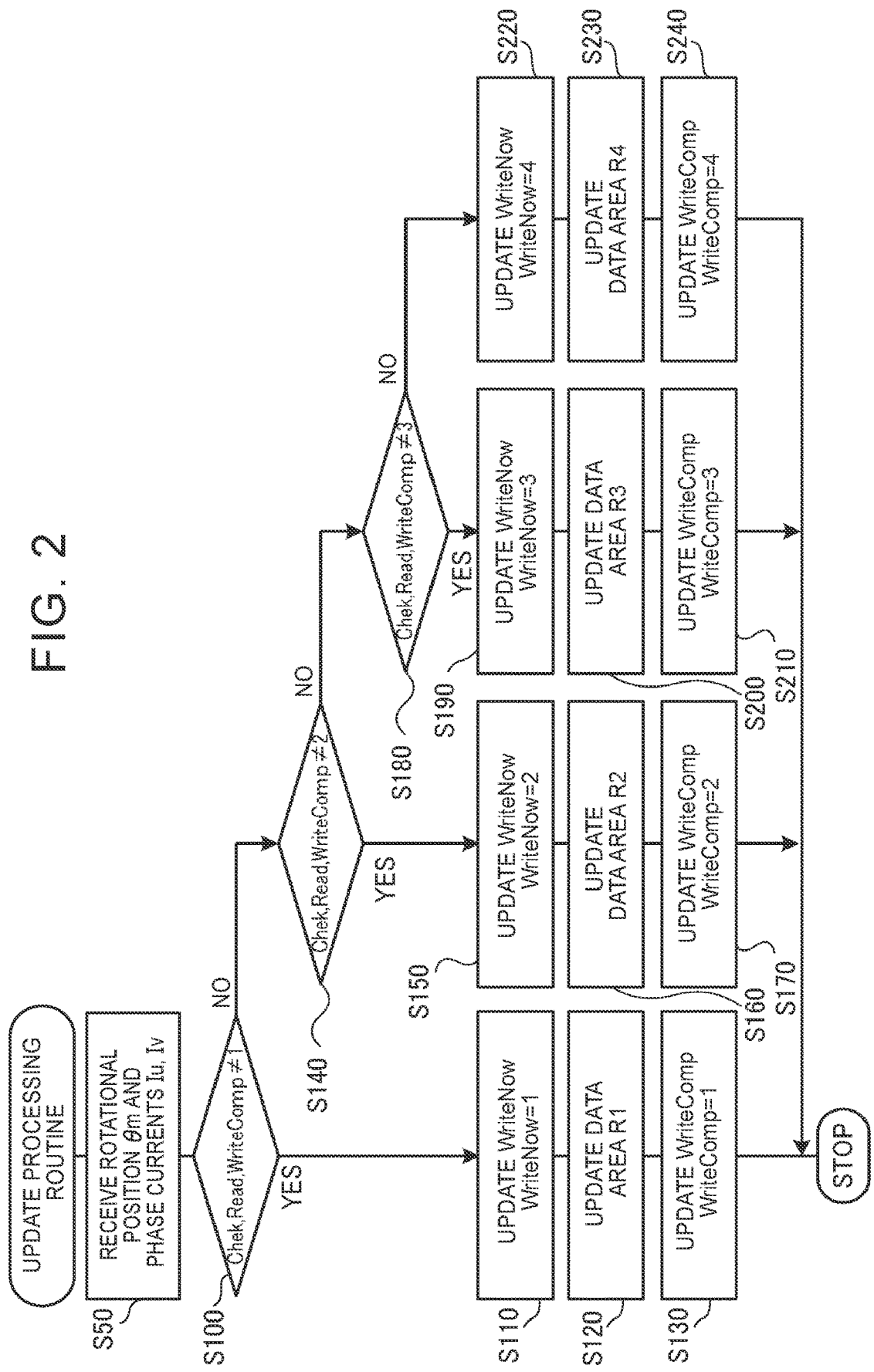

The processor core 34a performs control operation on the motor 22. In control operation of the motor 22, the processor core 34a receives a rotational position θm of the rotor of the motor 22 from a rotational position detection sensor 22a, and also receives phase currents Iu, Iv of the motor 22 from current sensors 22b, 22c. Then, the processor core 34a controls switching of the transistors of the inverter 24, through pulse width modulation control (PWM control) using the received rotational position θm and phase currents Iu, Iv of the motor 22, so that the motor 22 is driven according to a torque command Tm*. The control operation of the motor 22 is repeatedly executed at intervals of a first time (e.g., at intervals of 50 μsec). The processor core 34a updates data stored in any of the data areas R1-R4 of the shared memory 40 with data of the rotational position θm and phase currents Iu, Iv received in the control operation. The flowchart of FIG. 2 shows one example of an update processing routine executed by the processor core 34a. The update processing routine is repeatedly executed by the processor core 34a, each time the processor core 34a receives the rotational position θm and the phase currents Iu, Iv in the control operation of the motor 22, namely, at intervals of the first time.

Once the update processing routine is executed, the processor core 34a receives the rotational position Urn of the rotor of the motor 22 from the rotational position detection sensor 22a, and also receives the phase currents Iu, Iv of the motor 22 from the current sensors 22b, 22c (step S50). The processor core 34a then refers to (reads) values of "Check", "Read", and "WriteComp", out of the indexes stored in the index area R5 of the shared memory 40, and determines whether value 1 is stored as a value of "Check", "Read", or "WriteComp" (step S100).

When all of the values of "Check", "Read", and "Write-Comp" are not equal to value 1 in step S100, namely, when the data area R1 is a non-object area that is not subjected to the abnormality determination, task and the reference task, and is not the one where the data update task was completed most recently (i.e., the data area R1 is not an object of updating of data in the latest update processing routine), the "WriteNow" of the index area R5 of the shared memory 40 is updated with value 1 (step S110). To perform this operation, the processor core 34a sends a request for updating of data, an address of "WriteNow" in the index area R5, and value 1, to the shared memory 40. The shared memory 40 that has received the request for updating of data, address of "WriteNow" in the index area R5, and value 1 updates the value stored in the "WriteNow" of the index area R5 with value 1.

Subsequently, data stored in the data area R1 is updated with the data of the rotational position Om and phase currents Iu, Iv received in step S50 (step S120). To perform this operation, the processor core 34a sends a request for updating of data, an address of the data area R1, and the data, to the shared memory 40. The shared memory 40 that has received the request for updating of data, address of the data area R1, and the data updates the data stored in the data area R1 with the data received.

After updating the data stored in the data area R1, the processor core 34a updates "WriteComp" with value 1 (step S130), and finishes the update processing routine. To perform this operation, the processor core 34a sends a request for updating of data, an address of "WriteComp" in the index area R5, and value 1, to the shared memory 40. The shared memory 40 that has received the request for updating of data, address of "WriteComp" in the index area R5, and value 1 updates the value stored in the "WriteComp" of the index area R5 with value 1. Through this process, the data stored in the data area R1, as one of the data areas R1-R4, which is a non-object area that is not subjected to the abnormality determination task and the reference task, and is not the one where the data update task was completed most recently (i.e., which is not an object of updating of data in the latest update processing routine) can be updated with the data of the rotational position θm and phase currents Iu, Iv received in step S50.

When at least one value of "Check", "Read", and "Write-Comp" is value 1 in step S100, namely, when the data area R1 is subjected to the abnormality determination task or the reference task, or the, data update task is completed in the data area R1 most recently (i.e., the data area R1 is an object of updating of data in the latest update processing routine), the processor core 34a then refers to the values of "Check", "Read", and "WriteComp" out of the indexes stored in the index area R5 of the shared memory 40, and determines whether value 2 is stored as a value of "Check", "Read", or "WriteComp" (step S140), in the same manner as in step S100. When all of the values of "Check", "Read", and "WriteComp" are not equal to value 2, namely, when the data area R2 is a non-object area that is not subjected to the abnormality determination task and the reference task, and is not the one where the data update task was completed most recently (i.e., the data area R2 is not an object of updating of data in the latest update processing routine), the processor core 34a updates the "WriteNow" of the index area R5 of the shared memory 40 with value 2 (step S150), in the same manner as in step S110. Then, the processor core 34a updates the data stored in the data area R2 with data of the rotational position θm and phase currents Iu, Iv received in step S50 (step S160), in the same manner as in step S120, and updates the "WriteComp" with value 2 (step S170), in the same manner as in step S130. Then, the update processing routine ends. Through this process, the data stored in the data area R2, out of the data areas R1-R4, which is a non-object area that is not subjected to the abnormality determination task and the reference task, and is not the one where the data update task was completed most recently (i.e., the data area R2 is not an object of data updating in the latest update processing routine) can be updated with the data of the rotational position θm and phase currents Iu, Iv received in step S50.

When at least one value of "Check", "Read", and "Write-Comp" is equal to value 2 in step S140, namely, when the data area R2 is subjected to the abnormality determining task or the reference task, or the data update task was completed most recently in the data area R2 (i.e., the data area R2 is an object of data updating in the latest update processing routine), the processor core 34a refers to the values of "Check", "Read", and "WriteComp", out of the indexes stored in the index area R5 of the shared memory 40, and determines whether value 3 is stored as a value of "Check", "Read", or "WriteComp" (step S180), in the same manner as in step S100. When all of the values of "Check", "Read", and "WriteComp" are not equal to value 3, namely, when the data area R3 is a non-object area that is not subjected to the abnormality determination task and the reference task, and is not the one where the data update task was completed most recently (i.e., the data area R3 is not an object of data updating in the latest update processing routine), the "WriteNow" of the index area R5 of the shared memory 40 is updated with value 3 (step S190), in the same manner as in step S110. Then, the processor core 34a updates the data stored in the data area R3 with the data of the rotational position θm and phase currents Iu, Iv received in step S50 (step S200), in the same manner as in step S120, and updates the "WriteComp" with value 3 (step S210), in the same manner as in step S130. Then, the update processing routine ends. Through this process, the data stored in the data area R3, out of the data areas R1-R4, which is a non-object area that is not subjected to the abnormality determination task and the reference task, and is not the one where the data update task was completed most recently (i.e., which is not an object of data updating in the latest updating processing routine) can be updated with the data of the rotational position θm and phase currents Iu, Iv received in step S50.

When at least one value of "Check", "Read", and "Write-Comp" is equal to value 3 in step S180, namely, when the data area R3 is subjected to the abnormality determination task or the reference task process, or the data update task was completed most recently in the data area R3 (i.e., the data are R3 is an object of data updating in the latest updating processing routine), the "WriteNow" of the index area R5 of the shared memory 40 is updated with value 4 (step S220), in the same manner as in step S110. Then, the processor core 34a updates the data stored in the data area R4 with the data of the rotational position θm and phase currents Iu, Iv received in step S50 (step S230), in the same manner as in step S120, and updates the "WriteComp" with value 4 (step S240), in the same manner as in step S130. Then, the update processing routine ends. Through this process, the data stored in the data area R4, out of the data areas R1-R4, which is a non-object area that is not subjected to the abnormality determination task and the reference task, and is not the one where the data update task was completed most recently (i.e., which is not an object of data updating in the latest update processing routine) can be updated with the data of the rotational position θm and phase currents Iu, Iv received in step S50.

Figure 3:
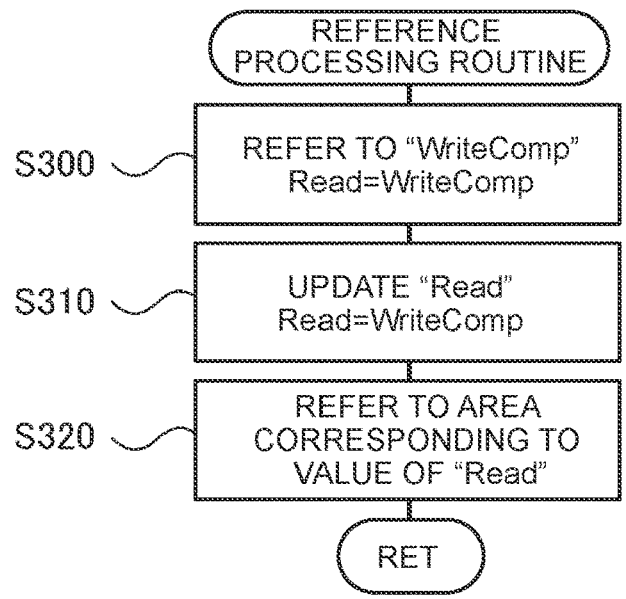
FIG. 3 is a flowchart illustrating one example of a reference processing routine executed by a processor core 34b.

Next, operation of the processor core 34b will be described. The processor core 34b performs sensor abnormality determining operation to determine an abnormality in the rotational position detection sensor 22a and the current sensors 22b, 22c. In the sensor abnormality determining operation, when any of the values of the rotational position θm and phase currents Iu, Iv is outside the range of the corresponding value that can be normally taken in the case where the rotational position detection sensor 22a and the current sensors 22b, 22c are normal, the processor core 34b determines that an abnormality occurs to the sensor that detects the value outside the range. The processor core 34b refers to data of the rotational position Om and phase currents Iu, Iv stored in the shared memory 40, as the values of the rotational position θm and phase currents Iu, Iv. Here, the reference task of referring to data of the rotational position θm and phase currents Iu, Iv stored in the shared memory 40 will be described. The flowchart of FIG. 3 illustrates one example of a reference processing routine executed by the processor core 34b. This routine is executed at intervals of a second time (e.g., 10 msec.) that is longer than the first time.

Once the reference processing routine is executed, the processor core 34b refers to (reads) the value of "Write-Comp" as one of the indexes stored in the index area R5 of the shared memory 40 (step S300). To perform this operation, the processor core 34b sends a request to refer to data, an address of "WriteComp" in the index area R5, to the shared memory 40. The shared memory 40 that has received the request to refer to data and the address of "WriteComp" in the index area R5 sends the stored value of "WriteComp" in the index area R5 to the processor core 34b.

The processor core 34b that has received the value of "WriteComp" in the index area R5 from the shared memory 40 updates the value of "Read" as one of the indexes stored in the index area R5 of the shared memory 40 (step S310).

To perform this operation, the processor core 34b sends a request to update data, an address of "Read" in the index area R5, and the received value of "WriteComp", to the shared memory 40. The shared memory 40 that has received the request to update data, address of "Read" in the index area R5, and the received value of "WriteComp" updates the value stored in the "Read" of the index area R5 with the received value of "WriteComp". The "WriteComp" indicates a data area where the update task was completed most recently, out of the data areas R1-R4 (i.e., a data area that was an object of updating of data completed by the processor core 34a when the processor core 34b executes step S300 of this routine). Thus, the operation of step S310 is to update the value of "Read" with the value indicating the data area where the update task was completed most recently, out of the data areas R1-R4.

After updating the value of "Read", the processor core 34b refers to (reads) data in the area, as one of the data areas R1-R4, which corresponds to the value of "Read" in the index area R5 of the shared memory 40 (step S320), and then finishes the reference processing routine. To perform this operation, the processor core 34b sends a request to refer to data and the address of "Read" in the index area R5, to the shared memory 40. The shared memory 40 that has received the request to refer to data and the address of "Read" in the index area R5 sends the stored value of "Read" in the index area R5, to the processor core 34b. The processor core 34b that has received the value of "Read" from the shared memory 40 sends a request to refer to data and the address of the data area corresponding to the received value of "Read", out of the data areas R1-R4, to the shared memory 40. The shared memory 40 that has received the request to refer to data and the address of the data area corresponding to the value of "Read" sends data stored in the data area corresponding to the value of "Read", to the processor core 34b. Through this process, the processor core 34b can detect whether an abnormality occurs to any of the rotational position detection sensor 22a and the current sensors 22b, 22c, by referring to data (rotational position θm, phase currents Iu, Iv) of the data area where the update task was completed most recently, out of the data areas R1-R4.

Figure 4:
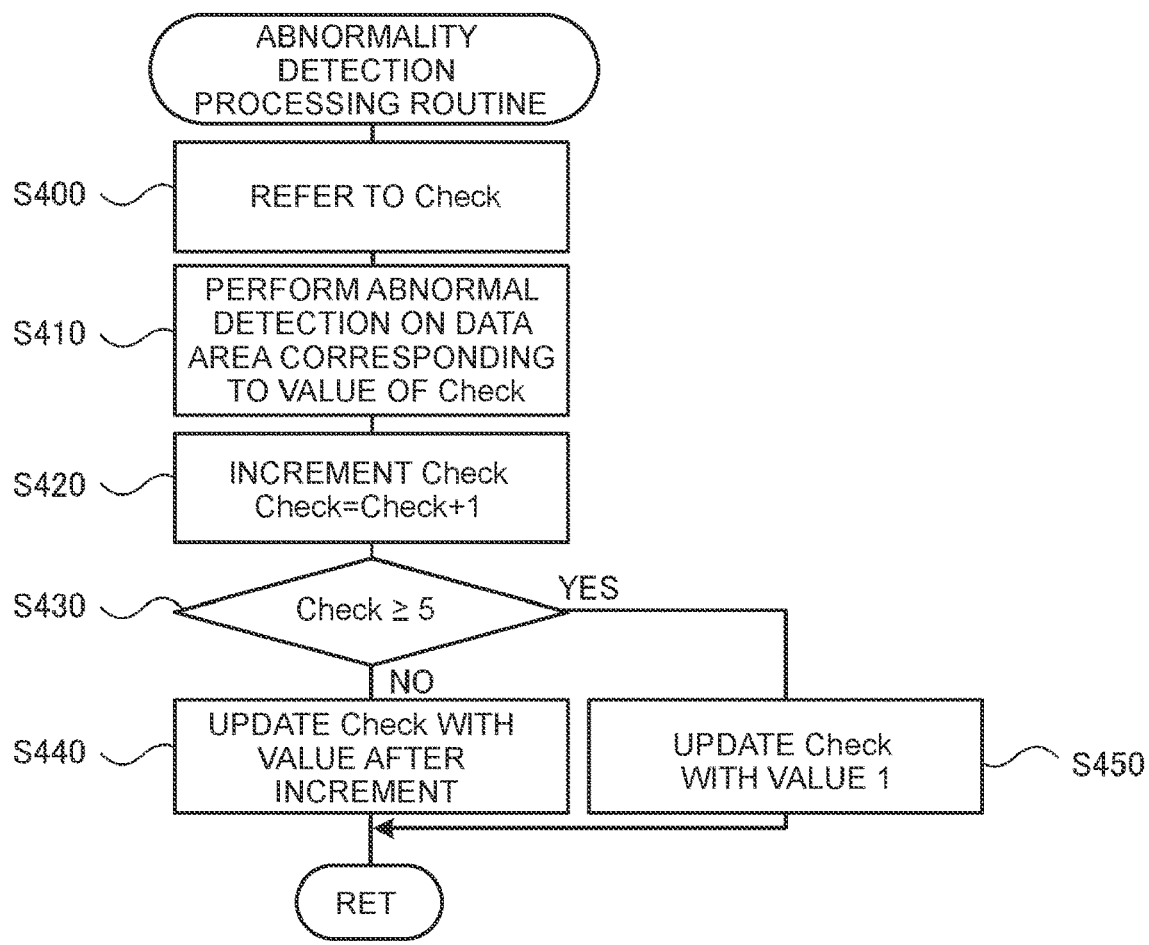
FIG. 4 is a flowchart illustrating one example of an abnormality detection processing routine executed by a processor core 34c.

Next, operation of the processor core 34c will be described. The processor core 34c performs memory abnormality detecting operation to detect whether an abnormality occurs to the data areas R1-R4 (i.e., detect the presence or absence of an abnormality in the data areas R1-R4), while updating the data areas R1-R4 of the shared memory 40 at the same time. The memory abnormality detecting operation is performed at intervals of a third time (e.g., 30 msec.) that is longer than the second time. The flowchart of FIG. 4 illustrates an abnormality detection processing routine executed by the processor core 34c. This routine is repeatedly executed at intervals of the third time.

Once the abnormality detection processing routine, is executed, the processor core 34c refers to (reads) a value of "Check" as one of the indexes stored in the index area R5 of the shared memory 40 (step S400). To perform this operation, the processor core 34c sends a request to refer to data and an address of "Check" in the index area R5, to the shared memory 40. The shared memory 40 that has received the request to refer to data and the address of "Check" in the index area R5 sends the stored value of "Check" in the index area R5 to the processor core 34c.

After receiving the value of "Check" of the index area R5 from the shared memory 40, the processor core 34c determines an abnormality in the area corresponding to the value of "Check", out of the data areas R1-R4 of the shared memory 40 (step S410). This operation is performed as follows. In the following description of step S410, the area corresponding to the value of "Check", out of the data areas R1-R4, is supposed to be the data area R1, for the sake of simplicity. The processor core 34c refers to (reads) data DATA1 stored in the data area R1, and temporarily stores it into the register 36. Subsequently, the processor core 34c writes predetermined abnormality determination data Dc as data for detecting an abnormality, into the data area R1 of the shared memory 40 (i.e., updates data of the data area R1 with the abnormality determination data). Then, the processor core 34c reads data stored in the data area R1 into the register 36, and compares the data Dcr thus read, with the abnormality determination data Dc. When the read data Dcr is identical with the abnormality determination data Dc, the processor core 34c determines that the data area R1 is normal, and returns the data DATA1 temporarily stored in the register 36, to the data area R1. When the read data Dcr is different from the abnormality determination data Dc, the processor core 34c determines that any abnormality (e.g., a memory fixation abnormality with which data stored in the data area R1 is fixed to HIGH or LOW) occurs in the data area R1.

After the abnormality detecting operation is carried out in the above manner, the processor core 34c increments the value of "Check" referred to in step S400 by value 1 (step S420), and detects whether the value of "Check" after the increment is equal to or larger than value 5 (step S430). When the value of "Check" after the increment is smaller than value 5, the value of "Check" in the index area R5 of the shared memory 40 is updated with the value of "Check" after the increment (step S440), in the same manner as in step S130 of the update processing routine illustrated in FIG. 2, and the abnormality detection processing routine ends. Through this process, when the value of "Check" after increment is smaller than value 5, the processor core 34c performs operation to detect an abnormality in the data area indicated by the value of "Check" after increment, in the next cycle of the routine. Thus, the processor core 34c successively detects whether an abnormality occurs in the data areas R1-R4, by repeating the abnormality detection processing routine.

When the value of "Check" after increment is equal to or larger than value 5 in step S430, the processor core 34c updates the value of "Check" in the index area R5 of the shared memory 40, with value 1 (step S450), in the same manner as in step S130 of the update processing routine illustrated in FIG. 2, and finishes the abnormality detection processing routine. Thus, the processor core 34c can detect whether an abnormality occurs in the data area R1, in the next cycle of the routine. Then, the processor core 34c can successively detect whether an abnormality occurs to the data areas R1-R4, by repeating the abnormality detection processing routine.

Figure 5:
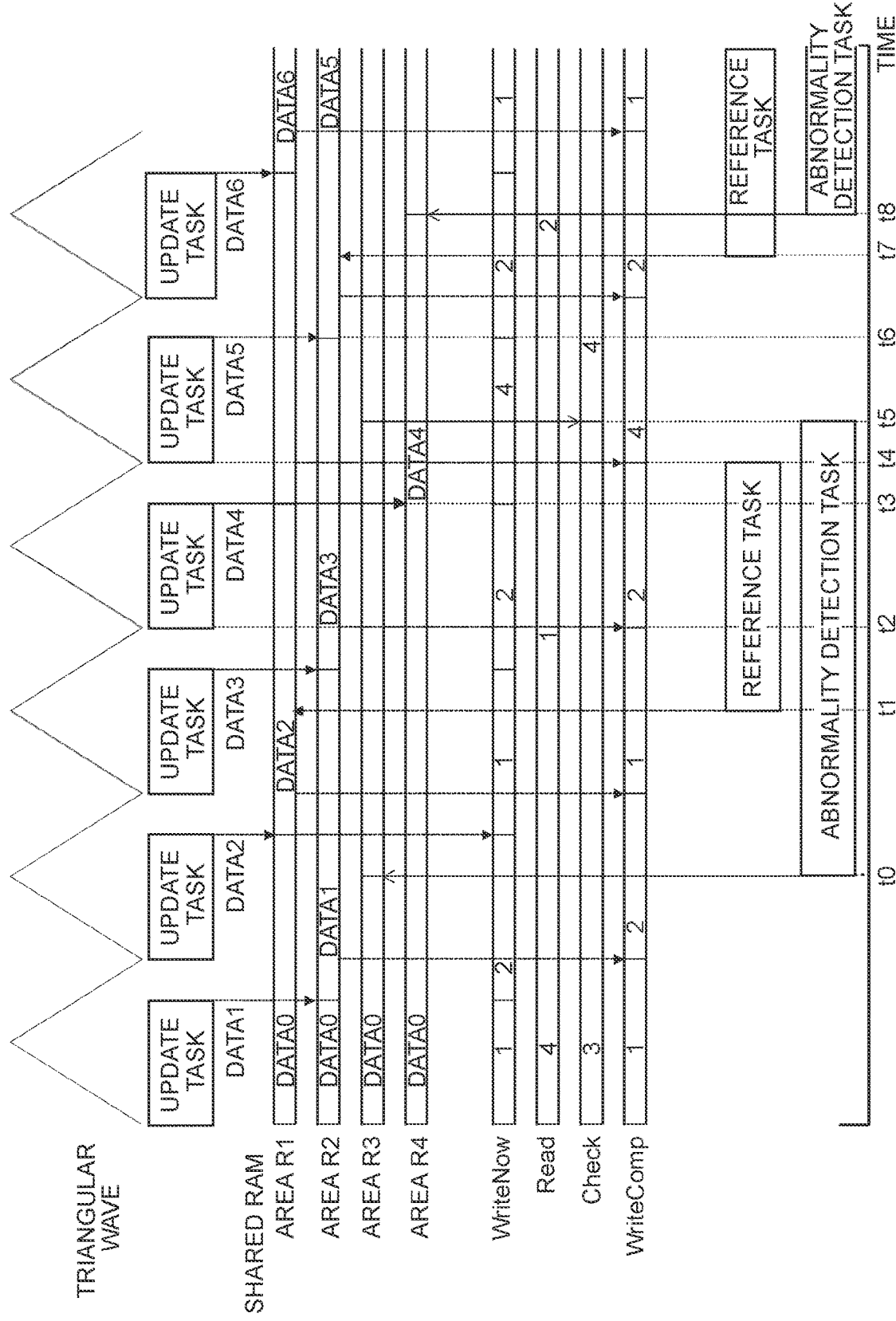
FIG. 5 is a timing chart showing one example of waveform of triangular wave used in PWM control of an inverter 24, and changes in data stored in data areas R1-R4 and each index stored in an index area R5, with time.

The timing chart of FIG. 5 shows one example of the waveform of triangular wave used in PWM control of the inverter 24, and changes in data stored in the data areas R1-R4 and each index stored in the index area R5, with time. Once the processor core 34b starts execution of the reference processing routine illustrated in FIG. 3, it refers to the index "WriteComp", updates "Read" with the value of "WriteComp", and refers to the data area corresponding to the value of "Read" (time t1, t7). Once the processor core 34c starts execution of the abnormality detection processing routine illustrated in FIG. 4, it detects whether an abnormality occurs to the data area corresponding to the value of the index "Check" (time t0, t8), and updates the value of "Check" (time t5). Once the processor core 34a starts execution of the update processing routine illustrated in FIG. 2 (at time t2, t4, for example), it updates data in a data area corresponding to a value that is not stored in all of "Check", "Read" and "WriteComp", namely, a data area that is not subjected to processing of the processor cores 34b, 34c, with data (e.g., DATA4, DATA5) to be written (at time t3, t6, for example). Thus, the processor core 34a updates data in the data area that is not subjected to processing of the processor cores 34b, 34c; therefore, the processor core 34a can appropriately update data, without conflicting with processing of the processor cores 34b, 34c.

According to the information processing apparatus of the embodiment as described above, the processor core 34a can appropriately update data, by performing the update task on the data area that is not subjected to processing of the processor cores 34b, 34c, out of the four data areas R1-R4.

The shared memory 40 has the index area R5 that stores four indexes of "WriteNow", "Check", "Read", and "WriteComp", and the processor core 34a writes a non-object data area that is different from the data areas indicated in "Check", "Read", and "WriteComp", out of the four data areas R1-R4, into the index "WriteNow", and then performs the update task on the non-object data area, so that the data stored in the data area of the shared memory 40 can be appropriately updated.

In the information processing apparatus of the embodiment, the processor core 34c performs an abnormality detection task of detecting whether an abnormality occurs to the data areas R1-R4, while updating the data areas R1-R4 of the shared memory 40 at the same time. However, any task may be performed, provided that the task involves updating of the data areas R1-R4 of the shared memory 40.

While the multi-core processor 32 includes three processor cores 34a-34c in the information processing apparatus of the embodiment, the multi-core processor 32 may include four or more processor cores.

While the shared memory 40 includes four data areas R1-R4 in the information processing apparatus of the embodiment, the shared memory 40 may include five or more data areas.

While the information processing apparatus of the disclosure is used in the motor system 20 in this embodiment, it may be used in other systems.

The correspondence relationship between main, elements of the embodiment and main elements of the disclosure described in the above section titled "SUMMARY" will be described. In the embodiment, the multi-core processor 32 is one example of "multi-core processor", and the shared memory 40 is one example of "memory".

The correspondence relationship between the main elements of the embodiment and the main elements of the disclosure described in "SUMMARY" is not supposed to limit the elements of the disclosure described in "SUMMARY", since the embodiment is one example for specifically describing one form for carrying out the disclosure described in "SUMMARY". Namely, the disclosure described in "SUMMARY" should be interpreted based on the description in this section, and the embodiment is merely one specific example of the disclosure described in "SUMMARY".

While one embodiment of the disclosure has been described above, the disclosure is not limited to this embodiment, but may be embodied in various forms, without departing from the scope of the disclosure.

The present disclosure can be utilized in manufacturing industries of information processing apparatuses, for example.

What is claimed is:

1. An information processing apparatus comprising:
   a multi-core processor including at least three processor cores; and
   a memory configured to be accessed by the at least three processor cores, wherein:
   the memory has at least four data areas adapted to store data;
   the memory has an index area that stores a plurality of indexes each indicating an object data area for each task performed on each of the at least four data areas, the object data area being selected from the at least four data areas and providing an object of processing performed by the at least three processor cores;
   the indexes include a first index, a second index, a third index, and a fourth index;
   the first index indicates a data area on which the update task is being performed;
   the second index indicates a data area on which a reference task of referring to data stored in the data area is being performed;
   the third index indicates a data area as an object of processing of an abnormality determination task of determining whether an abnormality occurs to the data area;
   the fourth index indicates a data area on which the update task is completed most recently;
   the at least three processor cores include a first processor core and a second processor core each configured to perform an update task of updating data stored in the at least four data areas; and
   the first processor core is configured to perform the update task on a non-object data area selected from the at least four data areas after writing one of the at least four data areas which is not indicated by the indexes into one of the indexes as the non-object data area, the non-object data area being not an object of processing performed by the second processor core and being a data area that is not indicated by any of the second index, the third index, and the fourth index.

2. The information processing apparatus according to claim 1, wherein
   the first processor core is configured to update the fourth index such that the fourth index indicates the data area that provides an object of the update task, when the update task is completed.

3. The information processing apparatus according to claim 1, wherein
   the second processor core is configured to successively perform an abnormality detection task of detecting whether an abnormality occurs to the data areas, on the at least four data areas.

* * * * *

UNITED STATES PATENT AND TRADEMARK OFFICE
CERTIFICATE OF CORRECTION

PATENT NO. : 10,846,132 B2  
APPLICATION NO. : 16/196796  
DATED : November 24, 2020  
INVENTOR(S) : Mikio Yamazaki Page 1 of 1

It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), Inventor 1, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 4, Line(s) 21, delete "$U_{rn}$" and insert --$\theta_m$--, therefor.

In Column 4, Line(s) 47, delete "$O_m$" and insert --$\theta_m$--, therefor.

In Column 6, Line(s) 44, delete "$O_m$" and insert --$\theta_m$--, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*